(12) United States Patent
Arlauskas et al.

(10) Patent No.: US 8,374,759 B2
(45) Date of Patent: Feb. 12, 2013

(54) METHOD AND CODE FOR CONTROLLING POWERTRAIN WITH LOCKUP TORQUE CONVERTER

(75) Inventors: Paul R. Arlauskas, Saline, MI (US); P. Brian McGrath, Manchester, MI (US); Zhong Li, Novi, MI (US); Chad Dalberg, Tipton, MI (US); Iqbal A. Chowdhury, Ann Arbor, MI (US); Jeremy Smith, Farmington, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 801 days.

(21) Appl. No.: 12/496,636

(22) Filed: Jul. 1, 2009

(65) Prior Publication Data

US 2010/0174461 A1 Jul. 8, 2010

Related U.S. Application Data

(60) Provisional application No. 61/077,419, filed on Jul. 1, 2008.

(51) Int. Cl.
*G06F 7/00* (2006.01)
(52) U.S. Cl. .......................................................... 701/54

(58) Field of Classification Search .................... 701/54, 701/69, 79, 93, 99, 103, 104
See application file for complete search history.

(56) References Cited

U.S. PATENT DOCUMENTS

| 4,593,581 | A | 6/1986 | Omitsu |
| 5,002,170 | A | 3/1991 | Parsons et al. |
| 5,935,043 | A | 8/1999 | Watanabe et al. |
| 2007/0179017 | A1* | 8/2007 | Yamada et al. ............. 477/107 |
| 2007/0225115 | A1* | 9/2007 | Nakajima et al. ........... 477/107 |
| 2007/0255472 | A1* | 11/2007 | Yumoto et al. .................. 701/67 |

* cited by examiner

*Primary Examiner* — Kim T Nguyen
(74) *Attorney, Agent, or Firm* — Ralph E. Smith

(57) ABSTRACT

A method of controlling a vehicle powertrain having an automatic transmission coupled to an engine through a lock-up torque converter includes determining when a torque converter unlock is imminent during a deceleration fuel shut-off event, and delaying the resumption of fuel flow to the engine for a calibratable time period to reduce the likelihood of an undesirable increase in engine output torque when the torque converter has not fully transitioned to an unlocked state. The method also includes determining whether one or more breakout conditions exist that require enabling fuel flow to the engine and, perhaps, triggering an active unlocking of the lock-up torque converter.

19 Claims, 2 Drawing Sheets

METHOD AND CODE FOR CONTROLLING POWERTRAIN WITH LOCKUP TORQUE CONVERTER

CROSS-REFERENCE TO RELATED APPLICATIONS

This application claims benefit of provisional application No. 61/077,419 filed Jul. 1, 2008, the disclosure of which is hereby incorporated by reference.

FIELD OF THE INVENTION

The invention relates to a vehicle powertrain having an engine coupled to a continuously-variable-ratio transmission through a lock-up torque converter and, more particularly, to a method and microprocessor-executed code for restoring or otherwise increasing fuel flow to the engine after a deceleration fuel shutoff.

BACKGROUND OF THE INVENTION

In order to achieve improved vehicle fuel economy, it is desirable to operate a vehicle featuring an automatic transmission, such as a continuously-variable-ratio transmission (CVT), driven through a lockup torque converter such that the torque converter operates in its fully-engaged or "locked" state as often as possible, i.e., over a wide range of vehicle speeds and driving conditions.

If the torque converter remains in the locked state during a vehicle deceleration characterized by a reduction in, or perhaps even a cessation of, fuel flow to the engine (the latter being a "fuel injectors off" condition, which necessarily achieves the greatest vehicle fuel economy), the resulting vehicle deceleration is typically quite smooth. Unfortunately, if the torque converter is still in a locked or partially-locked state when fuel flow to the engine is resumed (a "fuel injectors on" condition") or relatively increased, the resulting engine torque as transmitted through the locked or partially-locked torque converter can disadvantageously produce an unintended or unexpected sensation of change, which is sometimes referred to as a "surge" or "bump."

What is needed is a method and code for controlling the delivery of fuel to an engine coupled through a lock-up torque converter to an automatic transmission, such as a CVT, that reduces the likelihood of such an undesirable sensation of change, surge, or bump when the engine transitions from "fuel injectors off" to "fuel injectors on" and the torque converter is not yet in the unlocked state.

SUMMARY OF THE INVENTION

Under the invention, a method and code are provided for controlling the powertrain of a vehicle, wherein the powertrain includes an engine that drives an automatic transmission through a lock-up torque converter. Broadly, the method includes detecting a powertrain demand signal, as generated for example by a powertrain control module in response to such inputs as an accelerator pedal position, engine speed, engine and coolant temperature, vehicle accessory loads, and vehicle speed. The method also includes detecting the current state of the torque converter, i.e., whether the torque converter is in its "locked" state or is otherwise unlocked. The method further includes delaying, for a predetermined time period after detecting both a relatively-reduced powertrain demand signal and a "locked" torque converter state, the point in time at which the fuel injectors are either turned back "on" or the flow of fuel to the engine is otherwise increased, for example, in response to a relatively-increased powertrain demand signal. The predetermined time period is preferably represented by a calibratable value likely to ensure that the torque converter is no longer in the locked state, to thereby avoid the "bump" that might otherwise be generated when increasing engine torque with a partially locked-up torque converter. The predetermined time period is preferably adapted based on current powertrain loads, such as the presence of vehicle accessory loads, to thereby reduce the likelihood of that the engine speed will undershoot a desired target speed during the delay.

Thus, an exemplary method of practicing the invention includes determining when a torque converter unlock is imminent, for example, in response to generation of a torque converter unlock signal by a powertrain control module; and determining a fuel recovery delay timer threshold based upon at least one of the group consisting of engine speed, engine loads, and transmission coolant temperature. Once the speed difference exceeds the speed difference threshold, the powertrain controller can resume (or otherwise relatively increase) fuel flow to the engine without generating the "bump."

In accordance with another aspect of the invention, the method preferably also includes determining whether a breakout condition exists that may require turning the fuel injectors "on," notwithstanding the possibility of generating an undesirable "bump." For example, an exemplary method includes determining whether a target engine speed undershoot is imminent, for example, by determining whether the difference between the CVT's primary pulley speed and the current engine speed exceeds a predetermined threshold value, or by determining whether an engine speed gradient indicates a too-rapid fall in engine speed, or by determining whether the engine speed has fallen too much from the engine speed at the time the powertrain controller generated the torque converter unlock command. An exemplary method also includes detecting an ABS braking event; and actively unlocking the torque converter and turning the fuel injectors "on" in response to detecting an ABS braking event, to likewise preclude a target engine speed undershoot condition during such an ABS braking event.

Other objects, features, and advantages of the present invention will be readily appreciated upon a review of the subsequent description of the preferred embodiment and the appended claims, taken in conjunction with the accompanying Drawings.

DETAILED DESCRIPTION OF THE PREFERRED EMBODIMENT

Figure 1:
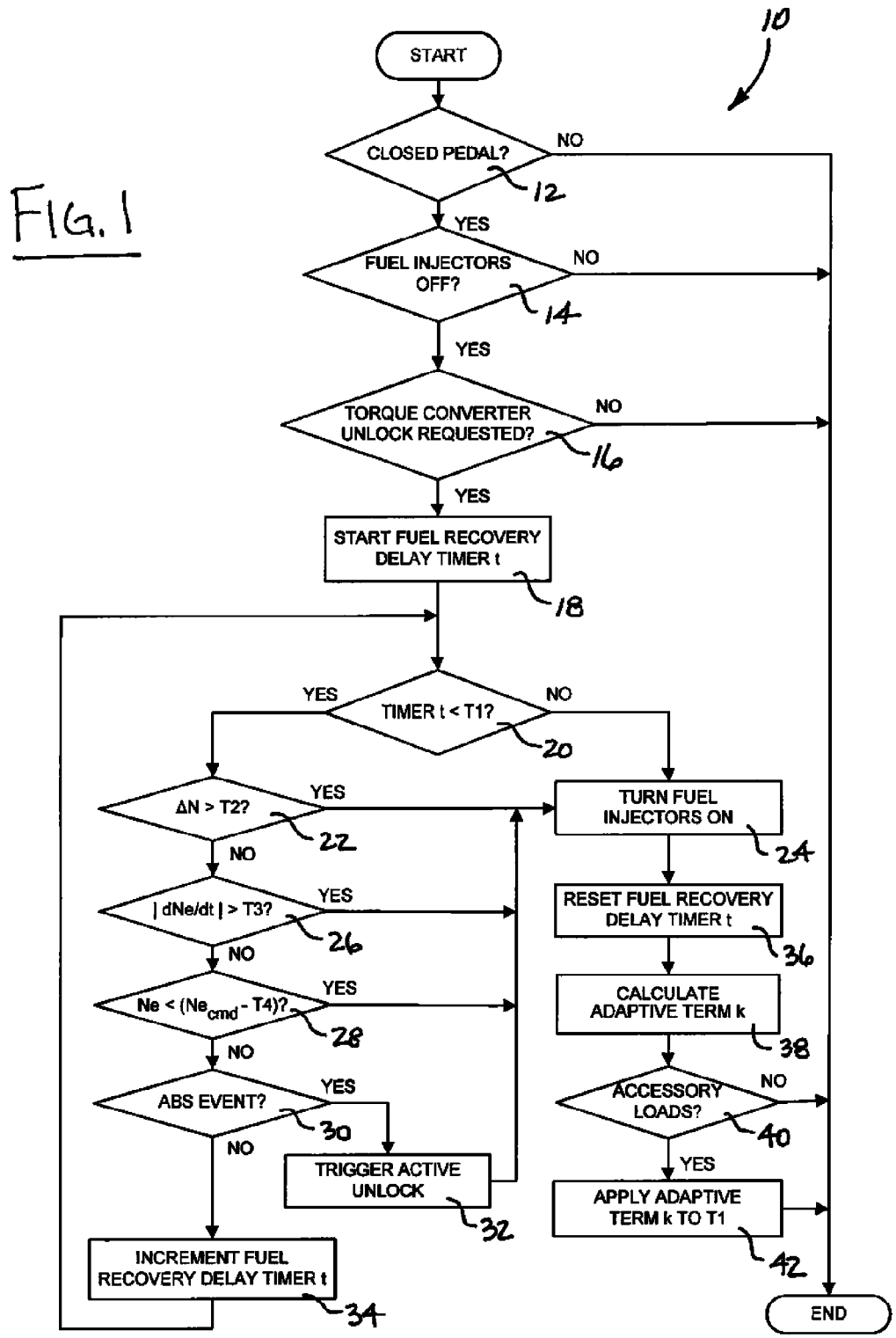
FIG. 1 is a flow chart showing the main steps of an exemplary method for practicing the invention.

FIG. 1 shows the main steps of an exemplary method for controlling the powertrain of a vehicle whose engine drives a continuously-variable automatic transmission (CVT) through a lock-up torque converter, wherein operation of the engine's fuel injectors is delayed, following a vehicle deceleration in which the torque converter is in a locked state, for a calibratable period that is likely to ensure that the torque converter is no longer in the locked state when engine torque is subsequently increased by such fuel injector operation.

Specifically, when there is little need for engine torque during a vehicle deceleration event, a powertrain controller in accordance with the invention advantageously maximizes vehicle fuel economy by completely shutting off fuel flow to the engine's fuel injectors and commencing a "deceleration fuel shut-off" ("DFSO") event. In accordance with the invention, if the torque converter is in its locked state during such a DFSO event, it is desirable to maintain the locked state for an initial period of time, to both provide for a smooth vehicle deceleration and to prevent a sudden drop in engine RPM as the fuel flow is cut to the engine.

Referring to FIG. 1, when the demand signal derived, for example, from a signal generated by an accelerator pedal position sensor is determined at step 12 to have been reduced to a minimum value, the fuel injectors remain "off" at step 14 to maximize vehicle fuel economy, and the powertrain controller has generated a torque converter unlock command at step 16 to initiate the transition of the torque converter from the locked state to the unlocked state, the powertrain controller starts a fuel recovery delay timer t at step 18. As the DFSO event continues and the torque converter begins to unlock, the powertrain controller determines whether a predetermined time period has passed since generating the torque converter unlock command at step 20, by comparing the fuel recovery delay timer t to a calibratable threshold value T1.

As seen in FIG. 1, if the fuel recovery delay timer t is determined at step 20 to be less than the calibratable threshold value T1, the powertrain controller determines whether one or more breakout conditions exist, to determine whether the "fuel injectors off" condition can otherwise advantageously continue for an additional processor background loop. Specifically, at step 22, the powertrain control controller determines whether the difference ΔN between the current primary pulley speed Np and the current engine speed Ne is greater than a calibratable speed difference threshold T2. By way of example only, in an exemplary embodiment which includes a 2.0 liter four-cylinder engine coupled to a CVT, the speed difference threshold T2 is about 45 RPM. If the powertrain controller determines at step 22 that the speed difference ΔN exceeds the calibratable speed difference threshold T2, the torque converter will likely have achieved its "unlocked" state and, hence, there is no longer a need to allow the fuel recovery delay timer t to run out before resuming fuel flow to the fuel injectors, and the fuel injectors can be turned on at step 24 without generating a "bump."

If the powertrain controller determines at step 22 that the calculated speed difference ΔN does not exceed the calibratable speed difference threshold T2, the powertrain controller determines at step 26 whether the absolute value of the engine speed gradient dNe/dt exceeds a predetermined engine speed gradient threshold T3. If the absolute value of the engine speed gradient dNe/dt exceeds threshold T3, signaling a rapid fall in engine speed, the powertrain controller immediately commands a resumption of fuel flow to the engine at step 24, to thereby preclude a target engine speed undershoot condition.

If the powertrain controller determines at step 26 that the absolute value of the engine speed gradient dNe/dt does not exceed threshold T3, the powertrain controller determines at step 28 if the current engine speed Ne has dropped below a minimum engine speed threshold that is itself calculated based on the engine speed $Ne_{cmd}$, at the time the powertrain controller commanded the torque converter unlock, minus a calibrated value T4 that is preferably selected by the powertrain controller from a lookup table based on current powertrain and vehicle parameters, including, for example, current engine accessory loads. By way of example only, in an exemplary method, if the selected calibratable value is 300 RPM, the method at step 28 ensures that the powertrain controller will breakout and turn the fuel injectors "on" when the engine speed Ne have fallen more than 300 RPM from its value at the time the powertrain controller commanded the torque converter unlock.

If the powertrain controller determines at step 28 that the current engine speed Ne has not yet fallen from its value $Ne_{cmd}$ by more than the calibrated value T4, the powertrain controller determines at step 34 whether an automatic braking system (ABS) event is occurring. If an ABS event is occurring, the powertrain controller commands a rapid unlocking of the torque converter at step 32, and enables a resumption of fuel flow to the engine's fuel injectors at step 24. Alternatively, if the powertrain controller determines at step 30 that an ABS braking event is not occurring, the powertrain controller increments the fuel recovery delay timer t at step 34 and loops back to step 20.

Referring again to FIG. 1, as noted above, if either the fuel recovery delay timer t has run out at step 20, or any of the breakout conditions have occurred at steps 22, 26, 28, or 30, the powertrain controller turns the fuel injectors "on," or otherwise permits a relative increase in the fuel flow to the engine, at step 24. The powertrain controller also resets the fuel recovery delay timer t at step 36, and calculates or otherwise obtains an adaptive term k for use in adapting the calibratable threshold value T1 that represents the amount of delay likely to result in the unlocking of the torque converter. While the invention contemplates use of an adaptive term k that modifies the threshold value T1 based on any suitable vehicle, engine, and powertrain parameters and inputs, in the exemplary method, the adaptive term k is derived from a lookup table based on current transmission coolant temperature.

Figure 2:
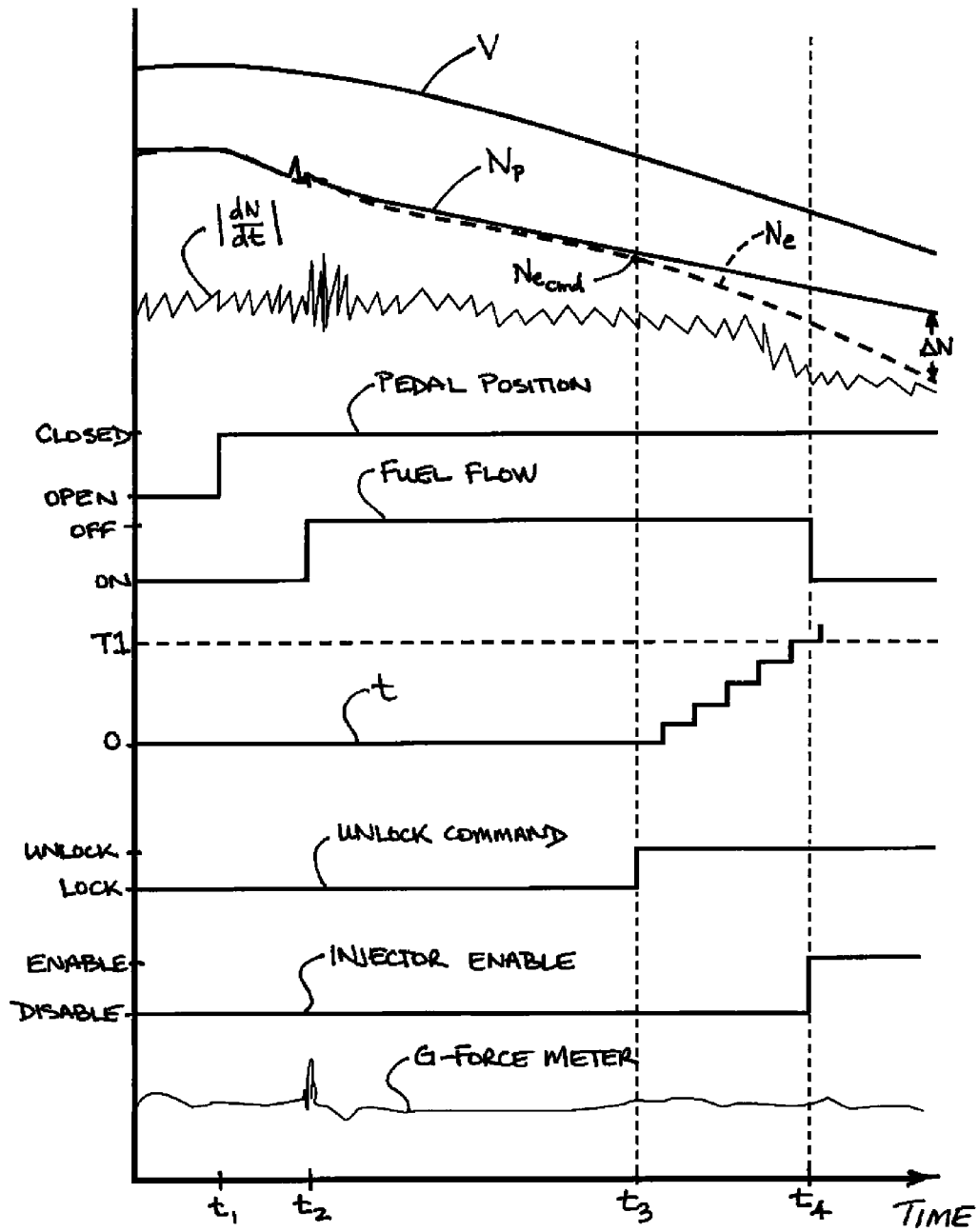
FIG. 2 is a plot of several vehicle and engine operating parameters versus time, for a vehicle operated in accordance with the exemplary method.

FIG. 2 contains related plots of several vehicle and engine operating parameters versus time, for a vehicle operated in accordance with the invention. Specifically, FIG. 2 contains plots versus time for each of the following: vehicle speed V, CVT primary pulley speed Np, engine speed Ne, engine speed gradient dNe/dt, accelerator pedal position (wherein "open pedal" corresponds to a wide-open-throttle demand signal, and wherein "closed pedal" corresponds to a minimum demand signal), fuel injector operation (wherein "off" means no fuel flow, and wherein "on" means that a pulse-width-modulated signal is being sent to the fuel injectors), a fuel recovery time threshold T1, a fuel recovery delay timer t, torque converter unlock request, a fuel injector enablement signal, and a G-force meter.

Referring to FIG. 2, at time $t_1$, the vehicle operator moves the accelerator pedal from an open pedal position to a closed pedal position, thereby representing a reduction in the powertrain demand signal to a minimum value. At time $t_2$, the powertrain controller responsively turns the fuel injectors "off," and the vehicle begins to lose velocity due to the resulting loss of engine torque. Because the torque converter remains in the locked state, the engine speed Ne continues to closely match the speed of the CVT's primary pulley between time $t_2$ and time $t_3$, when the powertrain controller generates a torque converter unlock command. With the conditions of steps 12, 14, and 16 of FIG. 1 satisfied, the powertrain controller starts the fuel recovery timer t at time $t_3$, and the engine speed Ne begins to gently fall below that of the CVT's primary pulley. Given the absence in FIG. 2 of any breakout condition, the timer t continues to increment until the timer t equals the fuel recovery threshold T1 at time $t_4$, by which time the torque converter has become fully unlocked. The powertrain controller then enables the fuel injectors to provide a desired engine torque.

While the above description constitutes the preferred embodiment, it will be appreciated that the invention is susceptible to modification, variation and change without departing from the proper scope and fair meaning of the subjoined claims.

What is claimed is:

1. A method for controlling the powertrain of a vehicle in response to a powertrain demand signal, wherein the powertrain includes an engine that drives an automatic transmission through a lock-up torque converter having a plurality of states including a locked state and an unlock state, the method including:
    upon detection, by a controller, of both a relatively-reduced powertrain demand signal and a locked torque converter state, the controller delaying for a predetermined time period an increase in a flow of fuel to the engine in response to a relatively-increased powertrain demand signal, the predetermined time period representing a time period sufficient to unlock the torque converter from the locked state.

2. The method of claim 1, wherein the predetermined time period is represented by a calibratable value, and further including adapting the calibratable value based on current powertrain loads.

3. The method of claim 1, further including identifying, during the predetermined time period, whether a breakout condition exists requiring an immediate increase in the flow of fuel to the engine.

4. The method of claim 3, wherein identifying includes determining whether a target engine speed undershoot is imminent.

5. The method of claim 3, wherein the automatic transmission is a continuously-variable-ratio transmission, and wherein identifying includes determining whether a difference between a transmission's primary pulley speed and a current engine speed exceeds a predetermined threshold value.

6. The method of claim 5, further including increasing the flow of fuel to the engine once the difference exceeds a speed difference threshold.

7. The method of claim 3, wherein identifying includes determining whether an engine speed gradient exceeds a predetermined value.

8. The method of claim 3, wherein identifying includes determining whether an engine speed has fallen too much from an engine speed at the time a powertrain controller generates a torque converter unlock command.

9. The method of claim 1, further including detecting an ABS braking event during the predetermined time period; and actively unlocking the torque converter and increasing the flow of fuel to the engine in response to detecting the ABS braking event.

10. A method for controlling the powertrain of a vehicle in response to a powertrain demand signal, wherein the powertrain includes an engine that drives an automatic transmission through a lock-up torque converter having a plurality of states including a locked state and an unlock state, the method including:
    upon detecting, by a controller, a relatively-increased powertrain demand signal while operating the powertrain with the torque converter in the locked state, the controller delaying for a predetermined time period an increase in a flow of fuel to the engine, the predetermined time period representing a time period sufficient to unlock the torque converter from the locked state;
    identifying, during the predetermined time period, whether a breakout condition exists requiring an immediate increase in the flow of fuel to the engine; and
    increasing the flow of fuel to the engine upon identifying the breakout condition.

11. The method of claim 10, wherein the predetermined time period is represented by a calibratable value, and further including adapting the calibratable value based upon at least one of the group consisting of engine speed, engine loads, and transmission coolant temperature.

12. The method of claim 10, wherein the breakout condition is an imminent target engine speed undershoot.

13. The method of claim 10, wherein the automatic transmission is a continuously-variable-ratio transmission, and wherein the breakout condition is a calculated difference between a transmission's primary pulley speed and a current engine speed that exceeds a predetermined threshold value.

14. The method of claim 10, wherein the breakout condition is a detected engine speed gradient that exceeds a predetermined threshold value.

15. The method of claim 10, wherein identifying includes determining whether an engine speed has fallen too much from an engine speed at the time a powertrain controller generates a torque converter unlock command.

16. The method of claim 10, wherein the breakout condition is a detected ABS braking event.

17. A non-transitory computer-readable storage medium containing computer-executable code for controlling the powertrain of a vehicle in response to a powertrain demand signal, wherein the powertrain includes an engine that drives an automatic transmission through a lock-up torque converter having a plurality of states including a locked state and an unlock state, the non-transitory computer-readable storage medium comprising:
    code adapted to detect a relatively-increased powertrain demand signal while operating the powertrain with the torque converter in the locked state;
    code adapted to calculate an increase in a fuel flow to the engine in response to the relatively-increased powertrain demand signal; and
    code adapted to delay for a predetermined time period, in response to the detecting, the calculated increase in the flow of fuel to the engine, the predetermined time period representing a time period sufficient to unlock the torque converter from the locked state.

18. The non-transitory computer-readable storage medium of claim 17, further including code adapted to adapt the predetermined time period based on based on detected powertrain loads.

19. The non-transitory computer-readable storage medium of claim 17, further including code adapted to identify, during the predetermined time period, whether a breakout condition exists requiring an immediate increase in the flow of fuel to the engine.

* * * * *